(12) United States Patent
Lee

(10) Patent No.: US 9,412,209 B2
(45) Date of Patent: Aug. 9, 2016

(54) PREVENTION DEVICE FOR OPERATING VEHICLE RUNNING RECORD

(71) Applicant: Hyundai Motor Company, Seoul (KR)

(72) Inventor: Byoung Wook Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 111 days.

(21) Appl. No.: 14/471,340

(22) Filed: Aug. 28, 2014

(65) Prior Publication Data

US 2015/0154818 A1    Jun. 4, 2015

(30) Foreign Application Priority Data

Dec. 4, 2013 (KR) ........................ 10-2013-0150013

(51) Int. Cl.
*H04L 9/14* (2006.01)
*G07C 5/08* (2006.01)

(52) U.S. Cl.
CPC ............ *G07C 5/08* (2013.01); *G07C 5/085* (2013.01); *H04L 9/14* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 6,961,671 B2 * | 11/2005 | Ko | ........................ | G07C 5/085 235/95 R |
| 7,295,136 B2 * | 11/2007 | Wakiyama | ............... | G11C 7/24 340/5.8 |
| 8,271,161 B2 * | 9/2012 | Meehan | .................. | G01C 22/02 340/438 |
| 2002/0164033 A1 * | 11/2002 | Rajasekaran | ........... | H04L 9/085 380/278 |
| 2003/0109972 A1 * | 6/2003 | Tak | ........................ | G06Q 10/02 701/31.4 |
| 2005/0073196 A1 * | 4/2005 | Kamiya | .................. | B60R 25/04 307/10.3 |
| 2007/0053510 A1 * | 3/2007 | Rosati | ................... | H04L 12/585 380/30 |
| 2009/0118899 A1 * | 5/2009 | Carlson | .................. | G01C 22/02 701/33.4 |
| 2011/0066317 A1 | 3/2011 | Lee | | |
| 2015/0235487 A1 * | 8/2015 | Proefke | .............. | G07C 9/00007 340/5.61 |

FOREIGN PATENT DOCUMENTS

| | | | |
|---|---|---|---|
| JP | 2003288623 A | * | 10/2003 |
| JP | 2005-070028 A | | 3/2005 |
| JP | 2013-110468 A | | 6/2013 |
| KR | 10-2004-0100035 | | 12/2004 |
| KR | 10-2009-0013529 A | | 2/2009 |
| KR | 20-2010-0002766 | | 3/2010 |
| KR | 10-2011-0028791 | | 3/2011 |
| KR | 10-2013-0065823 | | 6/2013 |

* cited by examiner

*Primary Examiner* — Michael R Vaughan
(74) *Attorney, Agent, or Firm* — Mintz Levin Cohn Ferris Glovsky and Popeo, P.C.; Peter F. Corless

(57) ABSTRACT

A prevention device for operating a vehicle running record is provided. The device includes a cluster controller that is configured to convert a received and stored accumulated running distance of the vehicle from a cluster of the vehicle to generate a plurality of different distributed secret pieces. In addition, a plurality of other controllers are configured to receive and store each of the plurality of distributed secret pieces from the cluster controller.

17 Claims, 4 Drawing Sheets

PREVENTION DEVICE FOR OPERATING VEHICLE RUNNING RECORD

CROSS-REFERENCE TO RELATED APPLICATION

This application is based on and claims priority from Korean Patent Application No. 10-2013-0150013, filed on Dec. 4, 2013 in the Korean Intellectual Property Office, the disclosure of which is incorporated herein in its entirety by reference.

BACKGROUND

1. Field of the Invention

The present invention relates to a prevention device for operating a vehicle running record, and more particularly, to a prevention device for operating a vehicle running record that prevents an operation of a vehicle running record by storing a plurality of running record copies generated using an algorithm.

2. Description of the Prior Art

Generally, a calculation of an accumulated running distance (e.g., integrated distance) of a vehicle is determined by calculating a cluster of information (e.g., data) received through sensors equipped within the vehicle. From the viewpoint of a flow of information, the accumulated running distance is calculated by information unilaterally provided from the sensors and information processing of the cluster.

However, a typical method for calculating an accumulated running distance which is determined by the information unilaterally provided may be arbitrarily operated in a mechanical cluster and also an electronic cluster. In particular, the accumulated running distance may be operated with less time and effort by replacing or reprogramming a chip of the electronic digital cluster. Consequently, the operation of the accumulated running distance causes the degradation in reliability of a vehicle state, in particular, causes a substantial side effect in an aftermarket.

Therefore, according to the typical method for calculating an accumulated running distance, first, may not be possible to secure the reliability regarding whether the accumulated running distance is accurately calculated and second, a vehicle may be illegally traded by arbitrarily operating a vehicle running record through forgery and falsification in a used-car market. Further, third, it may not be possible to secure a history of the replaced cluster of the vehicle. Therefore, a demand for a method for preventing forgery and falsification of an accumulated running distance of a vehicle has increased.

SUMMARY

Accordingly, the present invention provides a prevention device for operating a vehicle running record that prevents an operation of an accumulated running distance of a vehicle. In addition, the present invention provides a prevention device for operating a vehicle running record that calculates and verifies an originally accumulated running distance despite not receiving all distributed secret sharing pieces. The present invention further provides a prevention device for operating a vehicle running record that more accurately recovers an accumulated running distance from hacking in some of the controllers since distributed secret sharing piece information, not a copy of running record, is stored within the individual controllers.

In one aspect of the present invention, a prevention device for operating a vehicle running record may include: a cluster controller configured to convert a received and stored accumulated running distance of the vehicle from a cluster of the vehicle to generate a plurality of different distributed secret pieces; and a plurality of other controllers configured to receive and store each of the plurality of distributed secret pieces from the cluster controller.

The cluster controller may be configured to convert the accumulated running distance into the plurality of distributed secret pieces using a predetermined polynomial expression. The predetermined polynomial expression may calculate a plurality of different values based on numbers allocated to the plurality of other controllers, and the plurality of different calculated values may be the plurality of distributed secret pieces. The predetermined polynomial expression (f(x)) may be $$f(x)=s+a_1 x+a_2 x^2+\ldots+a_{m-1}x^{m-1}.$$

In the above Equation, the $a_1, a_2, \ldots, a_{m-1}$ may represent any integer, the x may represent numbers allocated to the plurality of other controllers, respectively, and the s may represent the accumulated running distance.

The cluster controller may be configured to transmit a first random value and first authentication information to the plurality of other controllers, respectively, along with the plurality of distributed secret pieces. The first random value may be a specific value determined by a random scheme, and the first authentication information may be information obtained by encrypting the first random value using an encryption algorithm and an encryption key. The plurality of other controllers may each be configured to generate second authentication information using the encryption algorithm and the encryption key using the first random value as an input, compare the second authentication information with the first authentication information, and when the second authentication information and the first authentication information coincide, store the received distributed secret pieces.

When an engine of the vehicle is turned on, each of the at least two of the plurality of other controllers may be configured to transmit a second random value and third authentication information to the cluster controller along with the stored distributed secret pieces. The second random value may be a specific value determined by a random scheme, and the third authentication information may be information obtained by encrypting the second random value using an encryption algorithm and an encryption key. The cluster controller may be configured to generate fourth authentication information using the encryption algorithm and the encryption key using the second random value as an input, compare the fourth authentication information with the third authentication information, and when the fourth authentication information and the third authentication information coincide, convert the received distributed secret pieces into the accumulated running distance.

The cluster controller may be configured to inform a vehicle user of when the converted accumulated running distance and the accumulated running distance stored in the cluster controller may be different from each other. When the cluster controller is replaced or reprogrammed to reset the accumulated running distance, each of the at least two of the plurality of other controllers may be configured to transmit a third random value and fifth authentication information to the cluster controller along with the stored distributed secret pieces. The third random value may be a specific value determined by a random scheme, and the fifth authentication information may be information obtained by encrypting the third random value using an encryption algorithm and an encryption key.

The replaced or reprogrammed cluster controller may be configured to generate sixth authentication information using the encryption algorithm and the encryption key using the third random value as an input, compare the sixth authentication information with the fifth authentication information, and when the sixth authentication information and the fifth authentication information coincide, convert the received distributed secret pieces into the accumulated running distance and set the converted accumulated running distance as a new running record.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
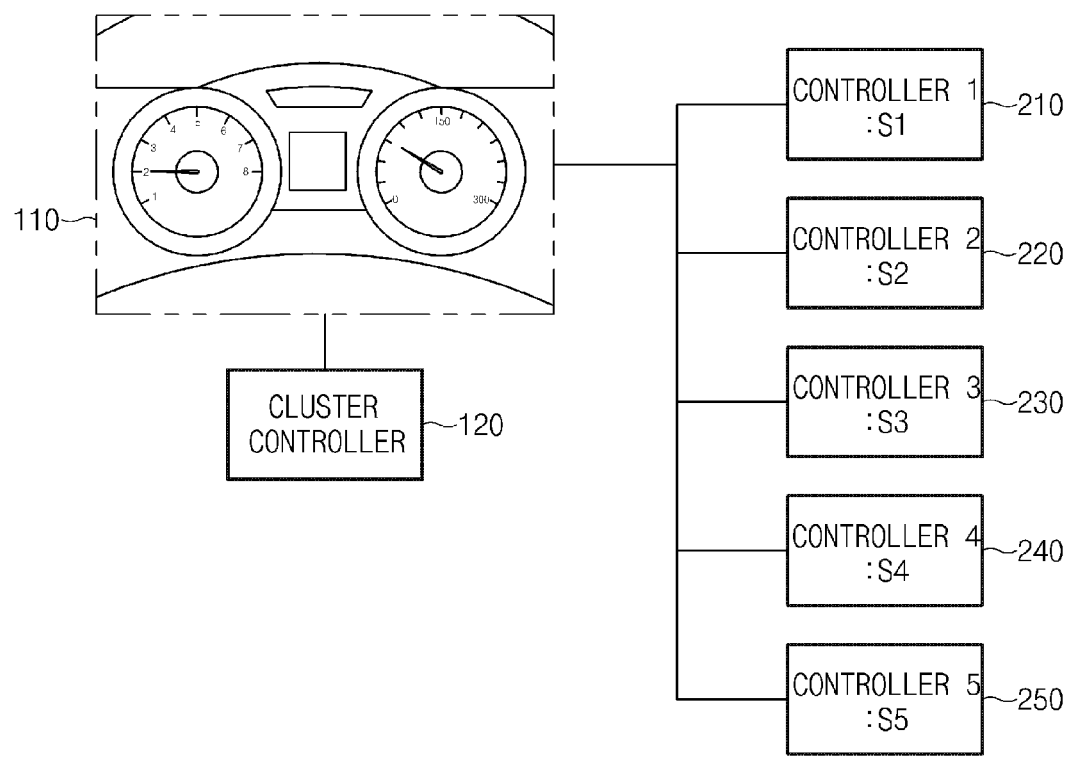
FIG. 1 is an exemplary diagram illustrating a prevention device for operating a vehicle running record according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present invention and methods to achieve them will be elucidated from exemplary embodiments described below in detail with reference to the accompanying drawings. Therefore, the present invention is not limited to the exemplary embodiments set forth herein, but may be modified in many different forms. However, these exemplary embodiments are provided so that this disclosure will be thorough and complete, and will fully convey the technical spirit of the invention to those skilled in the art.

In the drawings, the exemplary embodiments of the present invention are not limited the illustrated specific form, but clearly understand and/or easily embody the present invention, configurations of the present invention will be enlarged in the accompanying drawings. Herein, specific terms have been used, but are just used for the purpose of describing the present invention and are not used for qualifying the meaning or limiting the scope of the present invention, which is disclosed in the appended claims.

In the present section, terms 'and/or' are used as meaning including at least one of components arranged after and before any component. Further, expression 'connected/coupled' is used as a meaning including a case in which the parts are directly connected with each other and a case in which the parts are indirectly connected with each other with other elements interposed therebetween. Unless explicitly described to the contrary, a singular form includes a plural form in the present specification. In addition, components, steps, operations, and/or elements mentioned in the present specification do not exclude the existence or addition of one or more other components, steps, operations, and/or elements.

Hereinafter, exemplary embodiments of the present invention will be described in detail with reference to the accompanying drawings.

FIG. 1 is an exemplary diagram illustrating a prevention device for operating a vehicle running record according to an exemplary embodiment of the present invention. Referring to FIG. 1, the prevention device for operating a vehicle running record may include a cluster controller 120 and a plurality of other controllers 210 to 250 (e.g., vehicle controllers). An accumulated running distance may not be arbitrarily operated by a user, but a controller in which the running record is stored may be replaced and accordingly, the running record may be operated as a value different from an actually accumulated running distance of the vehicle. In particular, since a gain obtained by operating a tachograph costs more than a replacement cost of the controller in which the running record is stored, the operation of the running record is frequently made in an aftermarket.

Further, the cluster controller 120 may be configured to receive an accumulated running distance, which is recorded as the vehicle travels (e.g., runs), from the cluster 110 of the vehicle. The received accumulated running distance may be converted into a plurality of distributed secret pieces (S1 to S5) by the cluster controller 120. In particular, the plurality of distributed secret pieces have different values. That is, the distributed secret pieces may be encrypted information regarding the running distance of a vehicle and the information may be encrypted to prevent falsification of such information. Further, FIG. 1 illustrates one example in which the controllers 210 to 250 are five, but the number of controllers 210 to 250 are not limited thereto and therefore may be two or more.

The plurality of distributed secret pieces generated by converting the accumulated running distance using the cluster controller 120 may be distributed and stored in the plurality of controllers 210 to 250, respectively. For example, the controller 1 210 may be configured to receive and store a distributed secret piece S1 and the controller 2 220 receives and stores a distributed secret piece S2. In particular, the cluster controller 120 may be configured to transmit a first random value and first authentication information to the plurality of controllers 210 to 250, respectively, along with the plurality of distributed secret pieces, in which the first random value may be a specific value which determined by a random scheme and the first authentication information may be information obtained by encrypting the first random value with an encryption algorithm and an encryption key. Each of the controllers 210 to 250 may be configured to defend against (e.g., prevent the occurrence of) a forgery and falsification attack of the distributed secret pieces by transmitting and confirming the first random value and the first authentication information.

Figure 2:
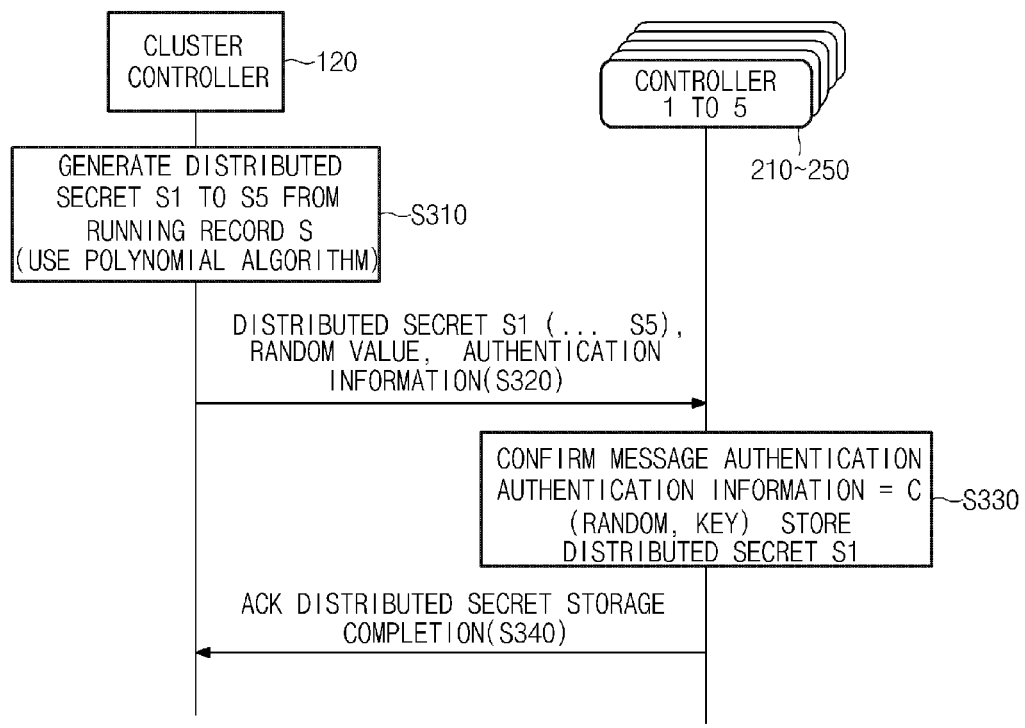
FIG. 2 is an exemplary diagram illustrating a process of storing an accumulated running distance by the prevention device for operating a vehicle running record according to the exemplary embodiment of the present invention.

FIG. 2 is an exemplary diagram illustrating a process of storing an accumulated running distance by the prevention device for operating a vehicle running record according to the exemplary embodiment of the present invention. Describing in detail with reference to FIG. 2, the plurality of controllers 210 to 250 may each be configured to receive the first random value and the authentication information, along with the distributed secret pieces (S320). Further, the plurality of controllers 210 to 250 may each be configured to generate second authentication information using the encryption algorithm and the encryption key used to generate the first authentication information in the cluster controller 120 using the first random value as an input in S310 (S330). The controllers 210 to 250 may further be configured to compare the generated second authentication information with the first authentication information received from the cluster controller 120, when two values of the second authentication information and the first authentication information coincide (e.g., corresponds to each other), determine that the distributed secret pieces S1 to S5 received along with the two values are the reliable distributed secret pieces S1 to S5 correctly transmitted from the cluster controller 120, and then store the received distributed secret pieces S1 to S5 in a memory (S330).

The prevention device for operating a vehicle running record according to the exemplary embodiment of the present invention may be configured to convert one accumulated running distance into the plurality (e.g., five) of distributed secret pieces S1 to S5 (e.g., encrypted running distance information) and store the distributed secret pieces S1 to S5 in separate controllers 210 to 250 and therefore again inversely convert the distributed secret pieces stored in controllers 2, 3, and 5 220, 230, and 250 which are the remaining controllers even though abnormality (for example, hacking) occurs in some controllers (for example, controllers 1 and 4 210 and 240) or the stored distributed secret pieces are not properly stored due to a failure of the cluster controller 120 and the network, thereby recovering the accumulated running distance of the vehicle.

Furthermore, a detailed example of converting the accumulated running distance received by the cluster controller 120 into the plurality of different distributed secret pieces S1 to S5 will be described. The cluster controller 120 may be configured to convert the accumulated running distance into the plurality of different distributed secret pieces S1 to S5 using a predetermined polynomial expression. For example, the distributed secret pieces may be distributed and stored in n controllers, and then as form (for instance m<n), when the accumulated running distance is recovered using m or more distributed secret pieces, as a polynomial expression for generating the distributed secret pieces, an m−1 order polynomial expression as the following Equation 1 may be used.

$$f(x)=s+a_1x+a_2x^2+\ldots+a_{m-1}x^{m-1}$$ Equation 1 wherein, $a_1, a_2, \ldots, a_{m-1}$ represents any integer, s represents the accumulated running distance, and x represents numbers allocated to the plurality of controllers, respectively.

In particular, as illustrated in FIG. 1, when the number of other controllers is five, the running record in which the accumulated running distance of the vehicle is about 10,000 km is distributed into 5 (n) controllers as the distributed secret pieces and among those, a process of recovering about 10,000 km which is the actually accumulated running distance from 3 (m) or more distributed secret pieces will be described. Any polynomial expression used in the cluster controller 120 may be the following Equation 2.

$$f(x)=10000+8x+7x^2$$ Equation 2

The distributed secret pieces S1 to S5 stored in the plurality of controllers 210 to 250, respectively, may be calculated as follows from the polynomial expression of the above Equation 2.

$$S1=f(1)=10000+8+7=10015$$

$$S2=f(2)=10000+16+28=10044$$

$$S3=f(3)=10000+24+63=10087$$

$$S4=f(4)=10000+32+102=10134$$

$$S5=f(5)=10000+40+175=10215$$

In other words, 10015 may be stored in the controller 1 210, 10044 may be stored in the controller 2 220, 10087 may be stored in the controller 3 230, 10134 may be stored in the controller 4 240, and finally, 10215 may be stored in the controller 5 250. As described above, one accumulated running distance (about 10,000 km) may be converted into the plurality of different distributed secret pieces S1 to S5 and may then be distributed and stored in the plurality of controllers 210 to 250, respectively.

Generally, the process of storing the accumulated running distance of the vehicle in the controller may be performed when a user of a vehicle ends the driving of the vehicle, that is, when the engine is turned off. Further, the accumulated running distance of the vehicle may be converted from the cluster controller 120 for each period regardless of the turning on/off of the engine which is associated with the driving/parking of the vehicle and then stored in the controllers 210 to 250.

Hereinafter, the process of recovering (i.e., inverse conversion) the value of the accumulated running distance from the distributed secret pieces stored in the controllers 210 to 250 will be described. For example, when the user of the vehicle turns on the engine to run the vehicle, the cluster 110 may be configured to display the accumulated running distance along with various types of information regarding the vehicle.

The prevention device for operating a vehicle running record according to the exemplary embodiment of the present invention may be configured to transmit the plurality of different distributed secret pieces S1 to S5, and store the pieces in the controllers 210 to 250, to the cluster controller 120 before the engine of the vehicle is turned off and thus the accumulated running distance may be displayed on the cluster. In particular, the cluster controller 120 may be configured to receive the distributed secret pieces from at least two of the plurality of controllers 210 to 250, to recover the accumulated running distance of the vehicle before the accumulated running distance is converted into the distributed secret pieces. The cluster controller 120 may be configured to recover the received distributed secret pieces S1 to S5 as the accumulated running distance of the vehicle using the same polynomial expression as any polynomial expression used when the engine is turned off or the accumulated running distance is stored. The process of recovering (i.e., inversely conversion) the distributed secret pieces S1 to S5 as the accumulated running distance is reverse to the process of converting described based on the following Equations 1 and 2, and therefore the detailed description thereof will be omitted.

Figure 3:
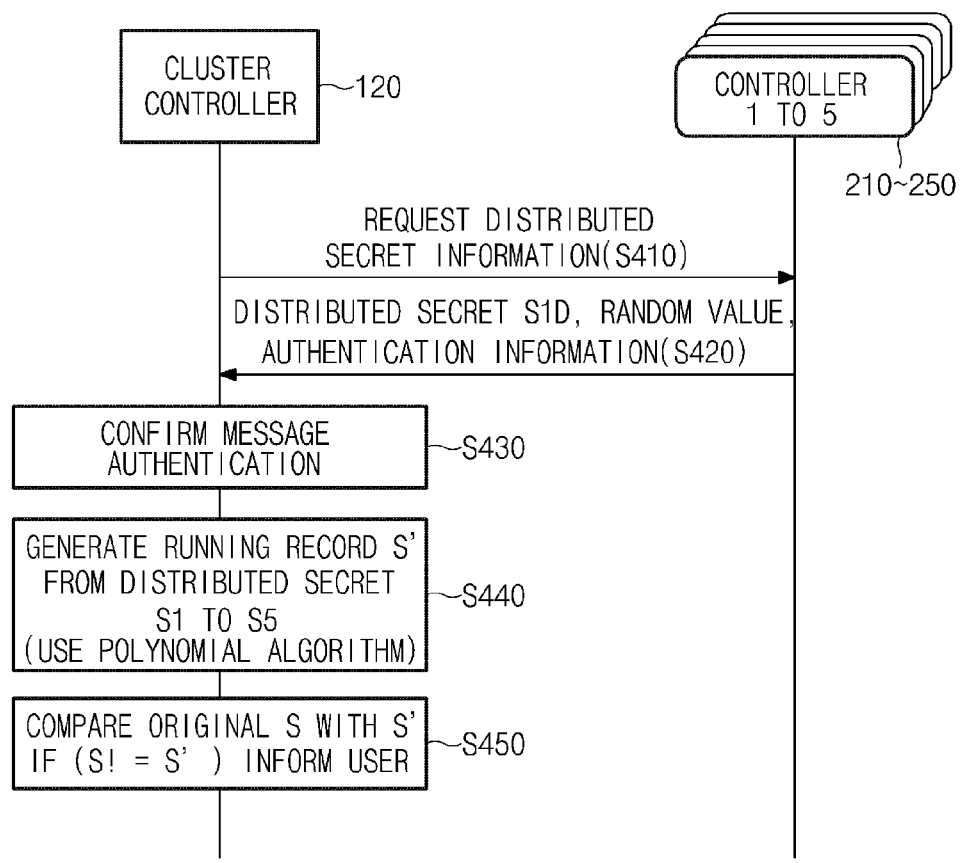
FIG. 3 is an exemplary diagram illustrating a process of recovering and verifying an accumulated running distance by the prevention device for operating a vehicle running record according to the exemplary embodiment of the present invention.

FIG. 3 is an exemplary diagram illustrating a process of storing an accumulated running distance by the prevention device for operating a vehicle running record according to the exemplary embodiment of the present invention. Describing in detail with reference to FIG. 3, the cluster controller 120 may be configured to request the plurality of controllers 210 to 250 to transmit the distributed secret pieces S1 to S5 (S410). That is, the plurality of controllers 210 to 250 may be operated by the cluster controller 120. At least two of the plurality of controllers 210 to 250 may be configured to transmit a second random value and third authentication information to the cluster controller 120 along with the plurality of distributed secret pieces S1 to S5 (S420), in which the second random value may be a specific value determined by the random scheme and the third authentication information may be information obtained by encrypting the second random value using the encryption algorithm and the encryption key. The cluster controller 120 may be configured to prevent a forgery and falsification attack of the received distributed secret pieces S1 to S5 by transmitting and confirming the second random value and the third authentication information.

In particular, the cluster controller 120 may be configured to generate fourth authentication information using the encryption algorithm and the encryption key used to generate the third authentication information in the plurality of controllers 210 to 250 using the second random value as an input. Additionally, the cluster controller 120 may be configured to compare the generated fourth authentication information with the third authentication information received from the plurality of controllers 210 to 250, when two values of the fourth authentication information and the third authentication information correspond to determine that the distributed secret pieces S1 to S5 received along with the two values are the reliable distributed secret pieces S1 to S5 correctly transmitted from the plurality of controllers 210 to 250 (S430), and then recover (e.g., determine) the accumulated running distance based on the received distributed secret pieces S1 to S5 (S440). Further, when the accumulated running distance recovered from the plurality of controllers 210 to 250 and the accumulated running distance stored in the cluster controller 120 are compared and are different from each other, the accumulated running distance may be suspected to be forgery and falsification (e.g., unreliable information), and the user of the vehicle may be informed of this situation by lamp, sound, and the like. In other words, the cluster controller 120 may be configured to warn a driver of unreliable information.

Figure 4:
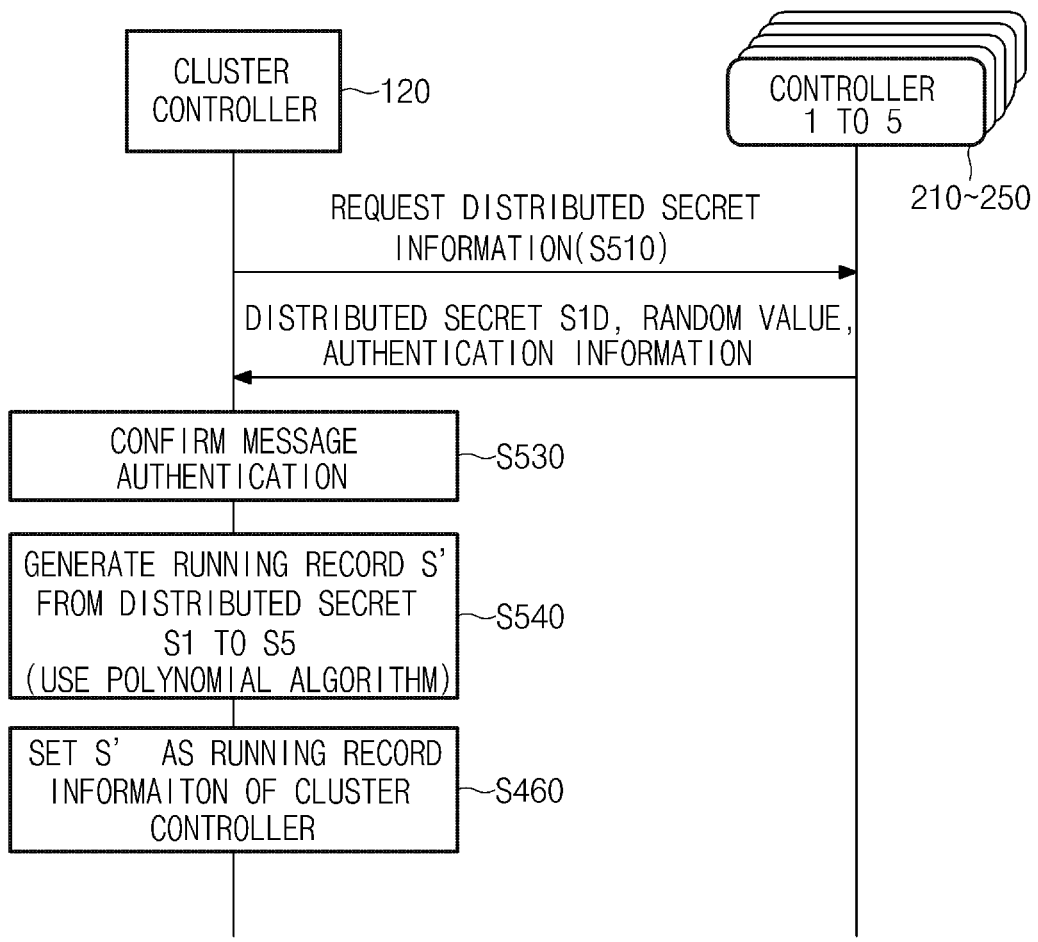
FIG. 4 is an exemplary diagram illustrating a process of recovering an accumulated running distance and setting the recovered accumulated running distance as a new running record by the prevention device for operating a vehicle running record according to the exemplary embodiment of the present invention.

FIG. 4 is an exemplary diagram illustrating a process of recovering an accumulated running distance and setting the recovered accumulated running distance as a new running record by the prevention device for operating a vehicle running record according to the exemplary embodiment of the present invention. Since the cluster controller of the vehicle may be aged (e.g., in need of replacement) and needs to be replaced or reprogrammed, when the accumulated running distance is reset, the existing accumulated running distance may be set as the new running record information.

Describing in detail with reference to FIG. 4, the cluster controller 120 which is to be replaced or reprogrammed may be configured to request the plurality of controllers 210 to 250 to transmit the distributed secret pieces S1 to S5 (S510). Each of at least two of the plurality of controllers 210 to 250 may be configured to transmit a third random value and fifth authentication information to the cluster controller 120 along with the stored distributed secret pieces S1 to S5 (S520). Particularly, the third random value may be a specific value determined by the random scheme and the fifth authentication information may be information obtained by encrypting the third random value using the encryption algorithm and the encryption key. The cluster controller 120 which is to be replaced or reprogrammed may be configured to defend against (e.g., prevent) a forgery and falsification attack of the received distributed secret pieces S1 to S5 by transmitting and confirming the third random value and the fifth authentication information.

In other words, the cluster controller 120 which is to be replaced or reprogrammed may be configured to generate sixth authentication information using the encryption algorithm and the encryption key used to generate the fifth authentication information in the plurality of controllers 210 to 250 using the third random value as an input. Further, the cluster controller 120 may be configured to compare the generated sixth authentication information with the fifth authentication information received from the plurality of controllers 210 to 250, when two values of the fifth authentication information and the sixth authentication information correspond to determine that the distributed secret pieces S1 to S5 received along with the two values are reliable distributed secret pieces S1 to S5 correctly transmitted from the plurality of controllers 210 to 250 (S530), and then recover the accumulated running distance based on the received distributed secret pieces S1 to S5 (S540). The recovered accumulated running distance may be set as a new running record of the cluster controller 120 which is to be replaced or reprogrammed.

As described above, the prevention device for operating a vehicle running record according to the exemplary embodiment of the present invention may be configured to convert the accumulated running distance into the plurality of different distributed secret pieces using the predetermined polynomial expression to secure the higher reliability against the falsification of the running record and the accumulated running distance due to the replacement of the controller and store the converted distributed secret pieces in each of the controllers. As the result, even when some of the plurality of controllers fail, have communication errors, or are forged/falsified, when at least two of the remaining controllers are correctly operated, the accumulated running distance may be recovered and thus the display reliability of the accumulated running distance of the vehicle may be improved.

According to the prevention device for operating a vehicle running record according to the exemplary embodiment of the present invention, it may be possible to prevent the operation of the accumulated running distance of the vehicle. Further, it may be possible to calculate and verify the original accumulated running distance even though only some of distributed secret sharing pieces are received. Since the distributed secret piece information, not the copy of the running record, is stored in the individual controllers, it may be possible to more accurately recover the accumulated running distance from hacking in some of the controllers.

Hereinabove, although the exemplary embodiments of the present invention have been disclosed for illustrative purposes, those skilled in the art will appreciate that various modifications, additions and substitutions are possible, without departing from the scope and spirit of the invention as disclosed in the accompanying claim. Accordingly, the scope of the present invention is not construed as being limited to the described exemplary embodiments but is defined by the appended claims as well as equivalents thereto. Considering the above contents, if the modifications and changes of the present invention belong to the range of the following claims and equivalents, the present invention is considered to include the changes and modifications of the present invention.

What is claimed is:

1. A prevention system for operating a vehicle running record, the system comprising:
   a cluster controller configured to: convert a received and stored accumulated running distance of the vehicle from a cluster of the vehicle to generate a plurality of different distributed secret pieces and transmit the plurality of distributed secret pieces along with a first random value and first authentication information to a plurality of other controllers, respectively, the first random value being a specific value which is determined by a random scheme, and the first authentication information being information obtained by encrypting the first random value using an encryption algorithm and an encryption key; and
   the plurality of other controllers configured to: receive each of the plurality of distributed secret pieces from the cluster controller, generate second authentication information using the encryption algorithm and the encryption key with the first random value, compare the second authentication information with the first authentication information, and store the received plurality of distributed secret pieces when the second authentication information and the first authentication information correspond to each other.

2. The prevention system of claim 1, wherein the cluster controller is configured to convert the accumulated running distance into the plurality of distributed secret pieces using a predetermined polynomial expression.

3. The prevention system of claim 2, wherein the predetermined polynomial expression calculates a plurality of different values based on numbers allocated to the plurality of other controllers, and the plurality of different calculated values are the plurality of distributed secret pieces.

4. The prevention system of claim 3, wherein the predetermined polynomial expression (f(x)) is $f(x)=s+a_1x+a_2x^2+\ldots+a_{m-1}x^{m-1}$ wherein, the $a_1, a_2, \ldots, a_{m-1}$ represents any integer, the x represents numbers allocated to the plurality of other controllers, respectively, and the s represents the accumulated running distance.

5. The prevention system of claim 1, wherein when an engine of the vehicle is turned on, each of the at least two of the plurality of other controllers are configured to transmit a second random value and third authentication information to the cluster controller along with the stored distributed secret pieces,
   the second random value is a specific value which is determined by a random scheme, and
   the third authentication information is information obtained by encrypting the second random value using an encryption algorithm and an encryption key.

6. The prevention system of claim 5, wherein the cluster controller is configured to:
   generate fourth authentication information using the encryption algorithm and the encryption key using the second random value as an input;
   compare the fourth authentication information with the third authentication information; and
   convert the received distributed secret pieces into the accumulated running distance when the fourth authentication information and the third authentication information corresponds with each other.

7. The prevention system of claim 6, wherein the cluster controller is configured to inform a vehicle user of when the converted accumulated running distance and the accumulated running distance stored in the cluster controller are different from each other.

8. The prevention system of claim 1, wherein when the cluster controller is to be replaced or reprogrammed to reset the accumulated running distance,
   each of the at least two of the plurality of other controllers is configured to transmit a third random value and fifth authentication information to the cluster controller along with the stored distributed secret pieces,
   the third random value is a specific value which is determined by a random scheme, and
   the fifth authentication information is information obtained by encrypting the third random value using an encryption algorithm and an encryption key.

9. The prevention system of claim 8, wherein the replaced or reprogrammed cluster controller is configured to:
   generate sixth authentication information using the encryption algorithm and the encryption key using the third random value as an input;
   compare the sixth authentication information with the fifth authentication information; and
   convert the received distributed secret pieces into the accumulated running distance and set the converted accumulated running distance as a new running record when the sixth authentication information and the fifth authentication information correspond with each other.

10. A prevention method of operating a vehicle running record, comprising:
   converting, by a controller, a received and stored accumulated running distance of the vehicle from a cluster of the vehicle to generate a plurality of different distributed secret pieces;
   transmitting, by the controller, the plurality of distributed secret pieces along with a first random value and first authentication information to a plurality of other controllers, respectively, the first random value being a specific value which is determined by a random scheme, and the first authentication information being information obtained by encrypting the first random value using an encryption algorithm and an encryption key;

receiving, by the plurality of other controllers, each of the plurality of distributed secret pieces;

generating, by the plurality of other controllers, second authentication information using the encryption algorithm and the encryption key with the first random value;

comparing, by the plurality of other controllers, the second authentication information with the first authentication information; and storing, by the plurality of other controllers, the received plurality of distributed secret pieces when the second authentication information and the first authentication information correspond to each other.

11. The method of claim 10, further comprising:
converting, by the controller, the accumulated running distance into the plurality of distributed secret pieces using a predetermined polynomial expression.

12. The method of claim 11, wherein the predetermined polynomial expression calculates a plurality of different values based on numbers allocated to the plurality of other controllers, and the plurality of different calculated values are the plurality of distributed secret pieces.

13. The method of claim 11, wherein the predetermined polynomial expression (f(x)) is $f(x)=s+a_1x+a_2x^2+ \ldots + a_{m-1}x^{m-1}$ wherein, the $a_1, a_2, \ldots, a_{m-1}$ represents any integer, the x represents numbers allocated to the plurality of other controllers, respectively, and the s represents the accumulated running distance.

14. A non-transitory computer readable medium containing program instructions executed by a controller, the computer readable medium comprising:
program instructions that convert a received and stored accumulated running distance of the vehicle from a cluster of the vehicle to generate a plurality of different distributed secret pieces;
program instructions that transmit the plurality of distributed secret pieces along with a first random value and first authentication information to a plurality of other controllers, respectively, the first random value being a specific value which is determined by a random scheme, and the first authentication information being information obtained by encrypting the first random value using an encryption algorithm and an encryption key;
program instructions that control the plurality of other controllers configured to: receive each of the plurality of distributed secret pieces, generate second authentication information using the encryption algorithm and the encryption key with the first random value, compare the second authentication information with the first authentication information, and store the received plurality of distributed secret pieces when the second authentication information and the first authentication information correspond to each other.

15. The non-transitory computer readable medium of claim 14, further comprising:
program instructions that convert the accumulated running distance into the plurality of distributed secret pieces using a predetermined polynomial expression.

16. The non-transitory computer readable medium of claim 15, wherein the predetermined polynomial expression calculates a plurality of different values based on numbers allocated to the plurality of other controllers, and the plurality of different calculated values are the plurality of distributed secret pieces.

17. The non-transitory computer readable medium of claim 15, wherein the predetermined polynomial expression (f(x)) is $f(x)=s+a_1x+a_2x^2+ \ldots +a_{m-1}x^{m-1}$ wherein, the $a_1, a_2, \ldots, a_{m-1}$ represents any integer, the x represents numbers allocated to the plurality of other controllers, respectively, and the s represents the accumulated running distance.

* * * * *